United States Patent Office

3,079,434
Patented Feb. 26, 1963

3,079,434
METHOD OF MAKING WATER INSOLUBLE
UNSATURATED AMIDES
Roger M. Christenson, Richland Township, Allegheny
County, Donald P. Hart, McCandless Township, Allegheny County, and Alexander N. Salem, Pittsburgh, Pa.,
assignors to Pittsburgh Plate Glass Company, Allegheny
County, Pa., a corporation of Pennsylvania
No Drawing. Filed Nov. 21, 1958, Ser. No. 775,380
6 Claims. (Cl. 260—561)

This invention relates to a novel method for preparing a useful class of monomeric amides, and to the preparation of polymeric products therefrom.

In a copending application, Serial No. 749,583, filed July 21, 1958, it is disclosed that very useful resinous materials can be prepared by reacting an aldehyde, and particularly formaldehyde, with an interpolymer of an unsaturated amide and at least one other monomer containing a

group. The resinous products obtained in this manner are particularly useful, either alone or in combination with other resinous materials, in the preparation of coating compositions, films of which exhibit outstanding gloss, durability, and chemical resistance.

However, while the materials described in the copending application referred to hereinabove possess outstanding properties, the preparation of these materials in the form of emulsions or beads is extremely difficult due to the fact that certain unsaturated amides, and particularly acrylamide, are water soluble, and because of the difficulties associated with the subsequent reaction of the amide interpolymer with formaldehyde.

It has now been discovered that these useful materials can readily be obtained in the form of emulsion or bead polymers, as well as in other forms, by first preparing an N-alkoxymethyl substituted unsaturated amide and then interpolymerizing this monomeric compound with at least one other monomer containing a

group. It is thus possible to obtain useful latices which are unusual in that they possess cross-linking properties due to the presence of N-alkoxymethyl substituted unsaturated amide in the polymer chain. As a result of these thermosetting characteristics, such polymers possess chemical resistance which is not obtainable from latices which are thermoplastic in character.

The preparation of the N-alkoxymethyl substituted unsaturated amides is accomplished in accordance with this invention by reacting an unsaturated amide such as acrylamide with formaldehyde and an alkanol under acidic conditions, and in the presence of a polymerization inhibitor.

The reaction of the unsaturated amide, methacrylamide, formaldehyde and butanol is described in U.S. Patent No. 2,173,005. However, the reaction as described in this patent produces an unnamed product which is described as being water soluble. This product could not have been an N-alkoxymethyl methacrylamide, specifically N-butoxymethyl methacrylamide, inasmuch as will be seen hereinafter, authentic N-butoxymethyl methacrylamide is substantially water insoluble. It is of course one of the primary objects of this invention to prepare water insoluble unsaturated amide monomers in order that emulsion and bead polymers can readily be prepared therefrom.

The reaction of an unsaturated amide with an alkanol and formaldehyde under acid conditions and in the presence of a polymerization inhibitor may be represented generally by the following reaction equation, wherein acrylamide is utilized for illustrative purposes:

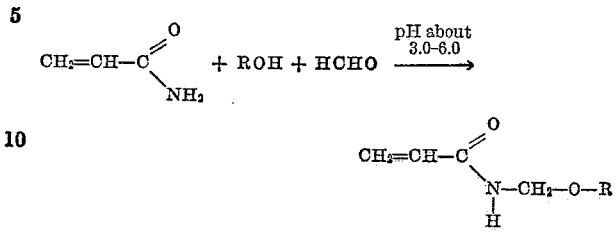

The reaction above depicted may proceed either by first forming N-methylol acrylamide which then reacts with the alcohol with the elimination of water (reaction Equations A and B), or by the reaction of the amide with a hemiformal (reaction product of alcohol and formaldehyde) with the elimination of water (reaction Equation C). These reactions are depicted structurally below:

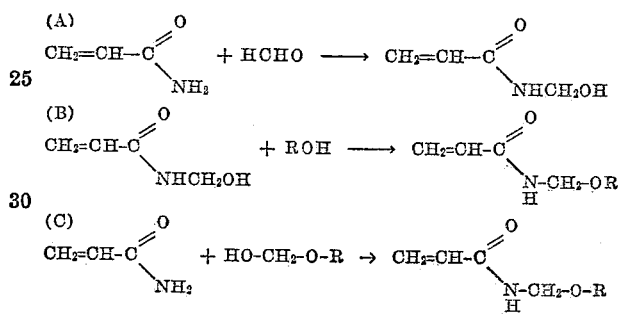

In the above equations, R represents an alkyl radical, and preferably a lower alkyl radical.

Because of the nature of the reactants employed in producing N-alkoxymethyl unsaturated amides in accordance with this invention, a number of side reactions may occur, and the fact that several do actually occur has been firmly established. Among the possible side reactions are the following:

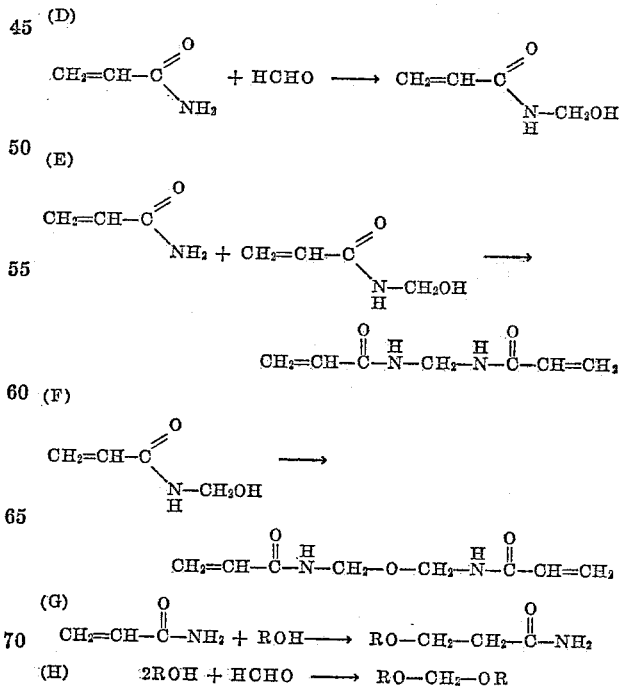

In addition to the foregoing reactions, polymerization of the amide utilized in the reaction and/or the desired N-alkoxymethyl unsaturated amide product may occur. Fortunately, conditions have been found which suppress to a considerable extent the above side reactions and result in good yields of the desired product.

The unsaturated amide which is reacted with formaldehyde and an alkanol in accordance with the present invention possesses the general structure:

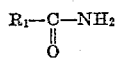

wherein $R_1$ is an aliphatic radical containing a single polymerizable double bond. Preferably, the double bond in the radical $R_1$ is in the alpha-beta position with respect to the carbonyl group in the above structure. The particularly preferred amides are those in which the double bond in addition to being alpha-beta to the carbonyl group is also a terminal double bond. Examples of the amides which may be employed include acrylamide, methacrylamide, alphacyano acrylamide, alphachloro acrylamide, crotonamide, the mono- or diamide of itaconic acid or fumaric acid, and the like. Preferably the radical $R_1$ contains from 2 to 6 carbon atoms. For reasons of availability and low cost, acrylamide is the preferred monomer for use in the reaction of this invention.

It is a useful feature of this reaction that the unsaturated amide starting material does not necessarily have to be in a pure form. For example, it is possible to utilize the crude reaction mixture obtained by reacting acrylonitrile with aqueous sulfuric acid, without first isolating the acrylamide from the reaction mixture as a crystalline compound.

The formaldehyde employed in the reaction may be in several forms; for example, polymers of formaldehyde such as paraformaldehyde or trioxymethylene may be used. It is also possible, and in fact very convenient, to utilize a solution of formaldehyde in the alkanol utilized to form the alkoxy portion of the desired product. Solutions of formaldehyde in alcohols are known commercially as "Formcels." For example, the product known as butyl Formcel contains approximately 40 percent formaldehyde, 53 percent butyl alcohol, and 7 percent water.

Any alkanol of the structure ROH, wherein R is an alkyl radical, can be reacted with the unsaturated amide and formaldehyde to produce N-alkoxymethyl substituted unsaturated amides. For example, such alcohols include methyl alcohol, ethyl alcohol, propyl alcohol, isopropyl alcohol, butyl alcohol, isobutyl alcohol, amyl alcohol, octyl alcohol, decyl alcohol, octadecyl alcohol, allyl alcohol, and the like. Preferably, however, a lower alcohol, and particularly butyl alcohol, is utilized.

As indicated hereinabove, the reaction of the unsaturated amide, formaldehyde, and the alcohol is carried out under acidic conditions. Preferably, the degree of acidity is such that the reaction mixture has a pH of about 3.0 to 6.0 during the major part of the reaction. Ordinarily, no additional acid need be added since the alcohol-formaldehyde solution is sufficiently acidic to bring the pH within the desired 3.0 to 6.0 range. However, mineral acids such as sulfuric acid, phosphoric acid, hydrochloric acid, and the like may be added, as may organic acids such as oxalic acid, citric acid, or tartaric acid and the like.

In order to prevent polymerization of the unsaturated amide reactant and/or the polymerizable product, and thus insure highest possible yields of the desired product, it is important that a polymerization inhibitor be present in the reaction mixture. Commercially available polymerizable amides such as acrylamide and methacrylamide may contain such inhibitors; however, it is generally desirable to add additional inhibitors prior to or during the course of the reaction. A particularly useful class of inhibitors for this purpose includes the quaternary ammonium salts such as the following compounds:

Trimethylbenzyl ammonium acetate
Trimethylbenzyl ammonium chloride
Trimethylbenzyl ammonium bromide
Triethylbenzyl ammonium chloride
Tripropylbenzyl ammonium chloride
Tributylbenzyl ammonium chloride
Cetyl trimethyl ammonium chloride
Octadecyl trimethyl ammonium chloride
Trimethylbenzyl ammonium sulfate
Lauryl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Octyl trimethyl ammonium bromide
Ethylene bis(pyridinium chloride)
Ethylene bis(trimethyl ammonium bromide)
Trimethylbenzyl ammonium oxalate
Trimethylbenzyl ammonium malate
Trimethylbenzyl ammonium tartrate
Trimethylbenzyl ammonium lactate Other polymerization inhibitors such as hydroquinone, pyrogallol, the monomethyl ether of hydroquinone, tertiary butyl catechol, 2,5-di-tetriary butyl hydroquinone, and the like may also be employed with good results. Amines such as N,N'-diphenylphenylene diamine and para-hydroxy diphenylamine can also be utilized.

In carrying out the reaction described hereinabove, a typical procedure involves dissolving the unsaturated amide in the alcohol and adding the resulting solution to a solution of the alcohol and formaldehyde, the latter solution including at least a part of the polymerization inhibitor. The resulting mixture is then refluxed, and after the reaction is substantially complete, the reaction mixture is washed with water, the alcohol is removed by distillation, as is the dialkyl formal by-product which is formed. The residue is a homogeneous liquid, which is almost entirely the desired N-alkoxymethyl unsaturated amide.

Alternative methods of processing include removal of the water by azeotropic distillation, or dispensing with the water washing followed by removal of the alcohol and dialkyl formal by distillation. If any solid precipitates in this procedure it is removed by filtration.

The formaldehyde is ordinarily added in excess to promote as rapid and complete a conversion of the amide to the methylol or alkoxymethyl derivative as possible and minimize the formation of the methylene bis-unsaturated amide by the reaction of Equation E as set forth hereinabove. Some formaldehyde is also consumed by the formation of a dialkyl formal as set forth in Equation H.

The alcohol is also generally added in excess to promote the formation of N-alkoxymethyl substituted unsaturated amides and to minimize side reactions E and F, and to avoid having the reaction stop at a stage represented by reaction D. The pH of the reaction is preferably increased toward the acid side as the reaction proceeds in order to first secure reaction of the unsaturated amide without formation of methylene bis-unsaturated amide, and later to force the alkylation of the N-methylol acrylamide to completion.

Fortunately, most of the by-products from the reaction are more water soluble than the desired product, and water washing provides a reasonably good separation of these materials.

The following examples illustrate in detail the preparation of N-alkoxymethyl substituted unsaturated amides in accordance with this invention. The examples are not intended to limit the scope of the invention, however, for

Example I

Three hundred fifty five (355) grams of acrylamide was dissolved in 640 grams of methanol and the solution filtered to remove the small quantities of ammonium sulfate present in commercial acrylamide. A mixture of 710 grams of methyl Formcel (46.5 percent formaldehyde in methanol and water) and 90 cubic centimeters of trimethylbenzyl ammonium chloride (60 percent solids in water) was then added to the filtrate and the resulting mixture refluxed for 3 hours. The reflux temperature was approximately 74° C. After the period of reflux, the reaction mixture was dissolved in 1000 cubic centimeters of water and the water and methanol distilled at reduced pressure. A yield of 521 grams (90.5 percent) of crude N-methoxymethyl acrylamide was obtained as residue. This material had a nitrogen content of 13.4 percent and a refractive index of 1.4968. The theoretical nitrogen content is 12.19. The fact that the actual nitrogen content was slightly high is believed due to the fact that the crude product probably contained some methylene bis-acrylamide.

Example II

A mixture of 355 grams (5 moles) of acrylamide, 1028 grams of n-propyl Formcel (40 percent formaldehyde, 53 percent propyl alcohol, and 7 percent water), 1208 grams of n-propyl alcohol, and 5 grams of hydroquinone was refluxed at a temperature of 95° C. for 3 hours. After refluxing, the mixture was washed three times with 500 cubic centimeters of a 5 percent aqueous solution of sodium hydroxide, and then was washed an additional three times with 1000 cubic centimeters of water. To the non-aqueous layer there was added 0.39 gram of hydroquinone, after which this layer was stripped at reduced pressures while blowing with an inert gas. Four hundred and one (401) grams (56 percent) of N-propoxymethyl acrylamide was obtained. This crude monomer was distilled under reduced pressure to give a relatively pure product having a nitrogen content of 9.4 per cent (theoretical value 9.72 percent), and a refractive index at 25° C. of 1.4620.

Example III

A mixture of 175.7 grams (2.5 moles) of acrylamide, 508 grams of isopropyl Formcel, 594 grams of isopropyl alcohol, and 0.354 gram of hydroquinone was refluxed for 6 hours at a temperature of about 89° C. The reaction mixture was then filtered and the excess isopropyl alcohol and diisopropyl formal distilled at reduced pressure. The residue was dissolved in toluene (1:3 ratio) and refrigerated. After filtration the toluene was distilled off at reduced pressure. Two hundred fifty four (254) grams of N-isopropoxymethyl acrylamide was obtained as a residue. The product had a nitrogen content of 9.9 percent (theoretical value 9.78 percent).

Example IV

A mixture of 1065 grams of acrylamide, 2475 grams of butyl Formcel, 4500 grams of butanol, and 180 cubic centimeters (60 percent aqueous solution) of trimethylbenzyl ammonium chloride was refluxed at a temperature in the range of 100° C. to 105° C. for 3 hours, cooled and then filtered. The filtrate was washed three times with 3000 cubic centimeters of water, the aqueous layer discarded, and 1.2 grams of hydroquinone added to the solvent layer. The solvent was then removed by distillation at reduced pressures and 1518 grams (65 percent) of N-butoxymethyl acrylamide was obtained. The product had a nitrogen content of 8.94 percent (theoretical value 8.92 percent), and an index of refraction at 25° C. of 1.4629.

Example V

This example illustrates a procedure for obtaining optimum yields of an N-alkoxymethyl substituted unsaturated amide.

A mixture of 355 grams of acrylamide, 825 grams of butyl Formcel, 1500 grams of butyl alcohol, and 90 cubic centimeters of a 60 percent aqueous solution of trimethylbenzyl ammonium chloride was refluxed at a temperature of about 102° C. for 3 hours, cooled and washed three times with 1000 cubic centimeters of water. The water layer was then removed and 1 gram of hydroquinone added to the solvent layer, and the solvent removed by distillation at reduced pressure. Five hundred thirty (530) grams of N-butoxymethyl acrylamide was obtained.

The water layer was then extracted with 1000 cubic centimeters of butyl alcohol and the butyl alcohol solution distilled at reduced pressure. Sixty nine (69) grams of a viscous material remained in the distillation flask. Another extraction with 1000 cubic centimeters of alcohol was carried out and 39 grams of a solid material was obtained. The water washed material was then stripped of water and 117 grams of product recovered.

This 117 grams, the 69 grams of viscous material and the 39 grams of solid, were mixed together in 500 cubic centimeters of butyl Formcel, 500 cubic centimeters of butyl alcohol and 2 grams of paratoluenesulfonic acid. The resulting mixture was then refluxed for 3 hours and washed with water 3 times and the solvent removed by distillation. An additional 220 grams of N-butoxymethyl acrylamide was obtained by this procedure, giving a total yield of 739 grams (94 percent) of product. The N-butoxymethyl acrylamide was substantially insoluble in water.

Example VI

The procedure of Example IV was repeated utilizing 355 grams of acrylamide, 825 grams of isobutyl Formcel, 1500 grams of isobutyl alcohol, and 5 grams of hydroquinone in the reaction mixture. Five hundred (500) grams of N-isobutoxymethyl acrylamide was obtained. This product had a nitrogen content of 8.8 percent (theoretical value 8.92 percent).

Example VII

The following materials were charged into a glass reactor equipped with reflux condenser, stirrer and temperature measuring means:

| | Grams |
| --- | --- |
| Methacrylamide | 425 |
| Butyl Formcel | 825 |
| Butanol | 1500 |
| Hydroquinone | 0.855 |

The above mixture was refluxed for 6 hours, after which the reaction mixture was filtered and distilled at reduced pressure. The residue was cooled in toluene solution and the toluene stripped off by distillation, giving a yield of 552 grams of N-butoxymethyl methacrylamide. This product had a refractive index at 25° C. of 1.4803 and a nitrogen content of 9.61 percent (theoretical value 8.18 percent). The nitrogen content of the product is believed to be high due to the presence of some bismethacrylamide as a contaminant.

Infrared analyses of the products of the foregoing examples on which nitrogen determinations had been carried out indicated in each instance that the structure obtained was that of the desired N-alkoxymethyl substituted unsaturated amide.

Among the by-products obtained in the process described in the foregoing examples is a dialkyl formal formed in accordance with Equation H set forth hereinabove. These dialkyl formals, and particularly dibutyl formal, are excellent solvents, and can be utilized with good results in coating compositions, for example, as replacements for alcohols. This affords a useful method of employing a by-product which otherwise would be useless and perhaps present a difficult disposal problem.

Many variations can be made in the procedures described in the examples. However, regardless of the procedural steps employed, an unsaturated amide of the structure

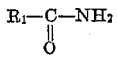

will react with formaldehyde and an alcohol of the structure ROH at a pH in the range of about 3.0 to 6.0 to give a compound of the structure

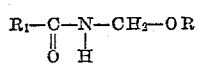

wherein R and $R_1$ have the significance set forth hereinabove.

The N-alkoxymethyl substituted unsaturated amides prepared according to the process of this invention are readily polymerizable and undergo polymerization in emulsion, in solution, or by mass techniques to produce useful polymers. The following examples illustrate the preparation of such polymers.

*Example VIII*

A mixture of 600 grams of ethyl acrylate and 220 grams of N-butoxymethyl acrylamide was washed with a 10 percent aqueous sodium hydroxide solution and with water and dried with sodium carbonate. Two hundred fifty six (256) grams of acrylonitrile was then added to 700 grams of the washed monomer mixture.

The following materials were then mixed in a glass reactor:

| | Grams |
|---|---|
| Water | 750 |
| Sodium salt of sulfate ester of an alkyl phenoxypolyoxyethylene ethanol (Alipal CO433) | [1] 68 |
| Glyceryl monoricinoleate (Nopco 2225C) | 10 |

[1] 28 percent active.

To this mixture 956 grams of the monomer mixture was added and the resulting mixture stirred until emulsified, after which 7.5 grams of ammonium persulfate and 0.75 gram of potassium bisulfite dissolved in 50 milliliters of water were added.

In still another glass reactor a mixture of 612.5 grams of water and 37.5 grams of 3 N-potassium hydroxide was heated in a water bath and maintained at a temperature of 90° C. The monomer emulsion was then added to the heated water-potassium hydroxide mixture through a dropping funnel with continuous agitation. Two hours and fifty minutes were required for the addition of the monomer emulsion. The resulting emulsion was maintained at 90° C. for an additional 1½ hours. The emulsion was then blown with inert gas for 10 minutes, cooled to 50° C., and 47.8 grams of a 20 percent solution of an alkylaryl polyether alcohol latex stabilizer added. The latex thus prepared had a solids content of 36.8 percent and a pH of 5.85. Films of the latex drawn down to a thickness of 0.003 inch on glass and air dried were clear and hard. Baked films of the latex were clear, tough, hard, and solvent resistant, indicating that cross-linking had taken place due to the presence of the N-butoxymethyl acrylamide in the polymer. The Brookfield viscosity of the latex (No. 1 spindle, 60 r.p.m.) was 9 cps. This material was useful also for binding together glass fibers into mats.

*Example IX*

The following materials were mixed in 1500 grams of water:

| | Grams |
|---|---|
| Sodium salt of sulfate ester of an alkyl phenoxypolyoxyethylene ethanol (Alipal CO 433) | [1] 140 |
| Glyceryl monoricinoleate (Nopco 2225C) | 20 |
| Ammonium persulfate | 15 |
| Potassium bisulfite | 1.5 |

[1] 28 percent active.

To this blend 2000 grams of a washed monomer mixture consisting of 38 percent ethyl acrylate, 34 percent styrene, and 28 percent N-butoxymethyl acrylamide was added.

In another glass reactor 1225 grams of water and 75 grams of 3 N-potassium hydroxide were heated to 90° C. and the above described emulsion slowly added thereto with constant agitation. The addition of the emulsion required about 2 hours, the temperature being maintained at 90° C. during said period and for an additional 2 hours. The emulsion was then cooled and 100 grams of a 20 percent alkylaryl polyether alcohol in water, a non-ionic type latex stabilizer, added. The total solids of the resulting latex was 39.5 and the pH 5.35. The latex formed clear films when drawn down on glass or metal and air dried. Baked films of the latex were hard and clear and possessed excellent solvent resistance.

By utilizing the procedure of the foregoing examples, the following additional N-butoxymethyl acrylamide interpolymers were prepared:

| | Percent |
|---|---|
| (1) N-butoxymethyl acrylamide | 19 |
| Isoprene | 33 |
| Styrene | 48 |
| (2) N-butoxymethyl acrylamide | 25 |
| Methyl methacrylate | 21 |
| Ethyl acrylate | 54 |
| (3) N-butoxymethyl acrylamide | 28 |
| Methyl methacrylate | 38 |
| Styrene | 34 |
| (4) N-butoxymethyl acrylamide | 28 |
| Glycidyl methacrylate | 35 |
| Ethyl acrylate | 37 |
| (5) N-butoxymethyl acrylamide | 15 |
| Styrene | 51 |
| Chlorobutadiene-1,3 | 34 |

All of these interpolymers were useful materials. For example, they could be used per se as binder resins for preparing glass fiber preforms or reinforcing mats, or they could be blended with other resinous materials, particularly with epoxy resins or epoxidized oils to form compositions which have useful film forming properties.

The following example illustrates the preparation of a solution polymer of an N-alkoxymethyl substituted unsaturated amide:

*Example X*

The following materials were charged into a glass reactor:

| | Grams |
|---|---|
| Ethyl acrylate | 975 |
| Styrene | 375 |
| N-butoxymethyl acrylamide | 400 |
| Butanol | 318 |
| Xylene | 1,272 |
| Cumene hydroperoxide | 15 |
| Tertiary dodecyl mercaptan | 15 |

The polymerization mixture was refluxed at a temperature of 112° C.–126° C. for approximately 8 hours with an additional 7½ grams of cumene hydroperoxide being added after each of the second, fourth, and sixth hours. The resulting resinous polymer had a total solids of 49.4 percent and a Gardner viscosity of V. Films of the resinous material baked at 350° F. for 30 minutes had a Sward hardness of 36 and an impact resistance in excess of 96 inch pounds.

The resinous polymer thus prepared could be blended with epoxy resins to give coating compositions having excellent adhesion to metallic surfaces, as well as outstanding gloss, durability, and chemical resistance.

*Example XI*

The following materials were charged into a glass reactor:

| | Grams |
|---|---|
| Styrene | 425 |
| N-propoxymethyl acrylamide | 100 |
| Toluene | 600 |
| Cumene hydroperoxide | 5 |
| Tertiary dodecyl mercaptan | 5 |

The above mixture was refluxed at a temperature of 119° C. to 112° C. for 9 hours with an additional 2½ grams of cumene hydroperoxide being added after the second, fourth, and sixth hours. The resulting resin had a total solids of 44.5 percent and a Gardner viscosity of O. This resin was utilized to prepare glass cloth and paper laminates having excellent strength and electrical properties. For example, two such glass cloth laminates had the following properties:

| Width (inch) | Thickness (inch) | Heat distortion, yield point, ° C. | Flexural strength (p.s.i.) | Modulus of elasticity (p.s.i.) |
|---|---|---|---|---|
| 0.506 | 0.125 | 108 | 43,300 | 1.82×10⁵ |
| 0.496 | 0.125 | 98 | 38,200 | 1.74×10⁵ |

It is also readily possible to utilize the N-alkoxy substituted unsaturated amides in mass polymerization processes. The resulting resinous products are useful as casting resins. The following example illustrates the mass polymerization of N-butoxymethyl acrylamide with styrene and ethyl acrylate.

*Example XII*

A mixture of 32.5 grams of ethyl acrylate, 12.5 grams of styrene, 11.0 grams of N-butoxymethyl acrylamide and 0.5 gram of benzoyl peroxide was heated in a glass flask at 80° C. for about 30 minutes at which time the mixture was in the form of a viscous syrup. This syrup was then poured into a glass plate mold and held at 80° C. in an oven for 16 hours. The resulting casting was very clear and flexible. The casting was then heated at 350° F. for 30 minutes after which it had hardened considerably and had become very solvent resistant.

*Example XIII*

A mixture of 340 grams of styrene and 132 grams of N-butoxymethyl acrylamide was washed with 10 percent potassium hydroxide solution followed by a second wash with water and removal of the excess water with anhydrous sodium carbonate. One hundred fifty (150) grams of the washed monomers was then heated, together with 3.0 grams of benzoyl peroxide, for approximately 45 minutes at temperatures in the range of about 71° C. to 81° C., after which the mixture had a Gardner viscosity of P. Ten (10) thicknesses of glass fiber cloth (Volan 181), were impregnated with the polymerization mixture, pressed to form a laminate, and placed in an oven at 176° F. for 2 hours, removed from the oven, cooled and placed back in the oven at 200° F. for 15 minutes, then at temperatures of 225° F., 250° F., 275° F., 300° F., and 325° F., at 15 minute intervals, and finally at 350° F. for ½ hour. The resulting laminate, which was clear and hard, contained 44.5 percent of resin in the cloth.

*Example XIV*

This example demonstrates the preparation of bead polymers of N-alkoxymethyl substituted unsaturated amides.

In a glass reactor, a mixture of 425 grams of methyl methacrylate and 165 grams of N-butoxymethyl acrylamide was washed with an aqueous alkali solution. In another glass reactor, the following materials were mixed:

| | Grams |
|---|---|
| Water | 1,400 |
| Sodium polyacrylate (Cyanamer 370; 15 percent solution) | 100 |
| Buffer solution: 8.5 grams disodium phosphate; 0.85 gram sodium phosphate; water | 50 |

The above mixture was stirred until homogeneous, after which a solution containing 500 grams of the mixed washed monomers, 5 grams benzoyl peroxide, and 10 grams of tertiary dodecyl mercaptan was added thereto.

The resulting mixture was heated and agitated for 4 hours at 75° C.–80° C., and then cooled to room temperature and filtered. Four hundred fifty grams (450) (90 percent) of hard beads was obtained. A 40 percent solids solution of the beads in toluene had a Gardner-Holdt viscosity of W—X, and baked films thereof were hard, clear, and chemically resistant.

It is also possible to polymerize the N-alkoxymethyl substituted unsaturated amides in such a way as to produce a polymer which is water soluble. The following example illustrates such a preparation.

*Example XV*

The following materials were emulsified in a glass reactor:

| | Parts by weight |
|---|---|
| Water | 80 |
| Sodium-N-methyl-N-oleoyl taurate (70 percent active) | 3 |
| Ethyl acrylate | 35.12 |
| Methyl methacrylate | 31.45 |
| N-butoxymethyl acrylamide | 29.53 |
| Methacrylic acid | 7.50 |
| Ammonium persulfate | ¹ 0.50 |

¹ In 2.5 parts water.

Ten (10) parts by weight of the above emulsion and 67.5 parts of water were mixed in a glass polymerization reactor and heated to a temperature of 90° C. The remaining emulsion was then added slowly over a 3-hour period with the temperature being maintained at 90° C. during the addition, and for a period of 1½ hours thereafter. The mixture was then cooled to 50° C. and 68 parts by weight of water and 3.5 parts by weight of 28 percent ammonium hydroxide added thereto.

The polymer thus produced had a solids content of 30 percent, a viscosity of 5000 c.p.s., a pH of 7.5–8.5, and was water soluble. Films of the water soluble polymer drawn down on glass plates and baked were hard and clear, and resistant to the action of solvents and other chemicals.

While specific examples of the invention have been set forth hereinabove, it is not intended that the invention be limited solely thereto, but to include all of the variations and modifications falling within the scope of the appended claims.

We claim:

1. A method of preparing a substantially water insoluble compound of the structure

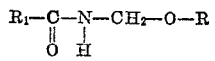

wherein $R_1$ is an aliphatic hydrocarbon radical containing from 2 to 6 carbon atoms and a single terminal polymerizable alpha, beta-ethylenically unsaturated group, and R is an alkyl radical containing from 3 to 18 carbon atoms which comprises reacting an unsaturated amide of the structure

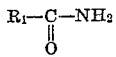

with a stoichiometric excess of formaldehyde in relation to the said amide and an alcohol of the structure ROH wherein R and $R_1$ have the significance given above and wherein the said alcohol is present in amounts equal to at least twice the number of moles of the said formaldehyde at a pH in the range of about 3.0 to 6.0 and in admixture with a polymerization inhibitor.

2. The method of claim 1 wherein $R_1$ is a

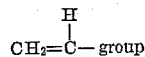

3. The method of claim 1 wherein $R_1$ is a

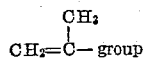

4. The method of claim 2 wherein R represents a propyl radical.

5. The method of claim 2 wherein R represents a butyl radical.

6. The method of claim 2 wherein R represents an isobutyl radical.

References Cited in the file of this patent

UNITED STATES PATENTS

| | | |
|---|---|---|
| 2,173,005 | Strain | Sept. 12, 1939 |
| 2,810,713 | Melamed | Oct. 22, 1957 |

FOREIGN PATENTS

| | | |
|---|---|---|
| 467,492 | Great Britain | June 11, 1937 |

OTHER REFERENCES

Schildknecht: "Vinyl and Related Polymers," page 321, John Wiley and Sons, N.Y. (1952).

UNITED STATES PATENT OFFICE
CERTIFICATE OF CORRECTION

Patent No. 3,079,434                        February 26, 1963

Roger M. Christenson et al.

It is hereby certified that error appears in the above numbered patent requiring correction and that the said Letters Patent should read as corrected below.

Column 2, lines 62 to 65, formula (F) should appear as shown below instead of as in the patent:

Signed and sealed this 4th day of August 1964.

(SEAL)
Attest:

ERNEST W. SWIDER                              EDWARD J. BRENNER
Attesting Officer                                  Commissioner of Patents